US 6,739,809 B2

(12) United States Patent
Shaffer

(10) Patent No.: US 6,739,809 B2
(45) Date of Patent: May 25, 2004

(54) CUTTING POINT FOR A DRILL

(75) Inventor: William A. Shaffer, Scottdale, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/955,792

(22) Filed: Sep. 19, 2001

(65) Prior Publication Data
US 2003/0053873 A1 Mar. 20, 2003

(51) Int. Cl.$^7$ .............................. B23B 51/02
(52) U.S. Cl. .......................... 408/230; 408/227
(58) Field of Search ...................... 408/227, 230, 408/229

(56) References Cited

U.S. PATENT DOCUMENTS

| 2,903,922 | A | * | 9/1959 | Ernst et al. ............ 408/230 |
| 3,564,947 | A | * | 2/1971 | Maier .................. 408/211 |
| 4,556,347 | A | * | 12/1985 | Barish ................. 408/230 |
| 4,583,888 | A | * | 4/1986 | Mori et al. ............ 408/59 |
| 4,684,298 | A | * | 8/1987 | Roos ................... 408/59 |
| 4,687,387 | A | * | 8/1987 | Roos ................... 408/144 |
| 4,826,368 | A | | 5/1989 | Tikal et al. ........... 408/225 |
| 4,831,674 | A | | 5/1989 | Bergstrom et al. ...... 470/199 |
| 4,898,503 | A | * | 2/1990 | Barish ................. 408/230 |
| 4,983,079 | A | * | 1/1991 | Imanaga et al. ........ 408/230 |
| 5,186,584 | A | | 2/1993 | Muller et al. ......... 408/26 |
| 5,273,380 | A | | 12/1993 | Musacchia ............. 408/230 |
| 5,678,960 | A | | 10/1997 | Just et al. ........... 408/230 |
| 5,716,172 | A | * | 2/1998 | Nakamura et al. ....... 408/230 |
| 5,762,538 | A | * | 6/1998 | Shaffer ............... 451/36 |
| 6,045,301 | A | | 4/2000 | Kammermeier et al. ... 408/57 |
| 6,056,486 | A | * | 5/2000 | Colvin ................ 408/59 |
| 6,132,149 | A | | 10/2000 | Howarth et al. ........ 408/230 |
| 6,309,149 | B1 | * | 10/2001 | Borschert et al. ...... 408/230 |
| 6,443,674 | B1 | * | 9/2002 | Jaconi ................ 408/1 R |

FOREIGN PATENT DOCUMENTS

JP 60-197307 * 10/1985 ............... 408/199

* cited by examiner

Primary Examiner—Daniel W. Howell
(74) Attorney, Agent, or Firm—Larry R. Meenan

(57) ABSTRACT

A cutting point for a drill including a body having a periphery. The cutting point includes a leading cutting lip and a trailing cutting lip and a central chisel edge extending between the leading and trailing cutting lips and defining two symmetrical drill point halves. Each drill point half includes a primary relief surface, a secondary relief surface and a third relief surface. The third relief surface is inclined at an angle greater than the secondary relief surface and the secondary relief surface is inclined at an angle greater than primary relief surface.

44 Claims, 4 Drawing Sheets

CUTTING POINT FOR A DRILL

BACKGROUND OF THE INVENTION

1. Field of the Invention

The present invention relates to a cutting point for a drill. More particularly, the present invention relates to a modified s-shaped cutting point for a drill to provide improved thrust and drilling performance.

2. Description of the Related Art

A conventional twist drill comprises a cylindrical drill body provided with a pair of helical flutes defining fluted lands between them and extending from the cutting point of the drill to a shank at the other end, by which shank the drill is securable in a chuck, for example, of a hand tool, or a drilling machine. The cutting point of the drill is of generally conical-shape, with a central chisel edge from which a pair of diametrically opposed cutting edges defined by the leading faces of the fluted lands and the flanks of the drill point that form the end faces of the fluted lands. The outer periphery of each fluted land has at its leading edge a radial projection which is variously termed a land, a cylindrical land, a wear margin, or a support margin. These two support margins extend along the length of their fluted lands and are intended to guide the drill radially as it forms a hole.

It is generally known that the helical grinding of a twist drill in the vicinity of the chisel, or cutting, edge results in a greater clearance angle. This is favorable for easy, centered spot drilling but not favorable for high feed rates, particularly since it weakens the chisel edge. Thus, in order to improve cutting conditions in twist drills having helically ground faces, corrections are often made at the chisel edge, e.g. by making it pointed or by adapting the side rake angle to the material to be drilled, as disclosed in Stock-Taschenbuch by R. Stock AG [Handbook published by the R. Stock AG], Berlin, 3rd Edition of 1979, at page 40.

SUMMARY OF THE INVENTION

Briefly, according to this invention, there is provided a cutting point for a drill. The drill includes a body having at least two diametrically opposite flutes. The body further includes a periphery, a web and lands extending from the web and having margins at leading edges of the lands. The flutes are positioned between the land.

The cutting point includes a leading cutting lip and a trailing cutting lip and a central chisel edge extending between the leading and trailing cutting lips and defining two symmetrical drill point halves. Each drill point half includes a primary relief surface, a secondary relief surface and a third relief surface. The primary relief surface is inclined radially outwardly from the central chisel edge to the periphery of the body and downwardly from the leading cutting lip to the secondary relief surface. The secondary relief is inclined radially outwardly from the central chisel edge to the periphery of the body and downwardly from the primary relief surface to a rake surface of the flute. The third relief surface is inclined radially outwardly from the central chisel edge to the rake surface of the flute and downwardly from the central chisel edge to the secondary relief surface. The third relief surface is inclined at an angle greater than the secondary relief surface and the secondary relief surface is inclined at an angle greater than primary relief surface.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENTS

Figure 1:
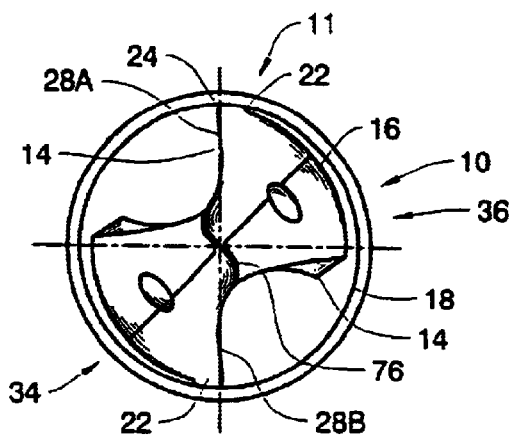
FIG. 1 is an end view of the twist drill in accordance with the present invention.
Figure 2:
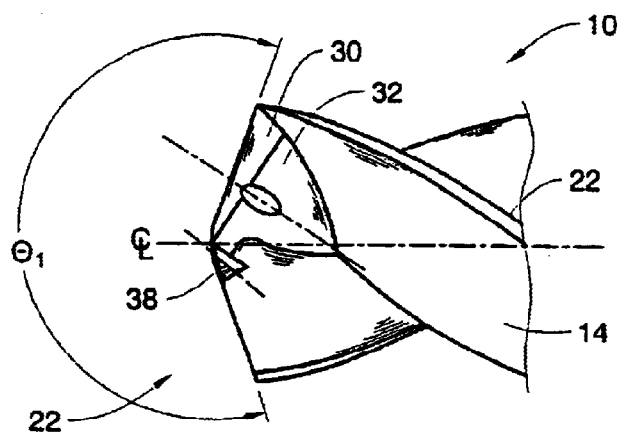
FIG. 2 is a partial side view of the twist drill of FIG. 1.

In the following description, like reference characters designate like or corresponding parts. Also in the following description, it is to be understood that such terms as "forward", "rearward", and the like, are words of convenience and are not to be construed as limiting terms apart from the invention as claimed.

Referring to the drawings, there is shown a twist drill 10 in accordance with the present invention. Although the present invention is shown in the form of a solid twist drill formed of metal or cemented carbide for convenience, it will be appreciated that the cutting point geometry may also be formed in an insert for a removable tipped drill that is formed of a metal or a cemented carbide and the like as well known in the art. Consequently, the illustration of the cutting point on a twist drill is not to be construed as a limitation of the invention except as otherwise claimed.

The twist drill 10 includes a cutting point 11 and a body 12 including at least two diametrically opposite flutes 14. The flutes 14 have a 30 degree helix angle bounding diametrically opposite fluted lands 16. The body 12 has a periphery designated in the figures as 18. The body 12 may be substantially cylindrical in shape or tapered as desired. The length of the body 12 includes, extending from the web 20 or central body portion thereof, lands 22. The flutes 14 are formed between the lands 22. Margins 24 are formed at the rotational leading edges of the lands 16.

The cutting point 11 on the leading end of the drill 10 is of a single angle design. As shown in the figures, the cutting point 11 has a point angle $\theta_1$ of approximately 140 degrees. The cutting point 11 includes a chisel edge 26 at the end of the web 20. Cutting lips 28 or edges extend from the chisel edge 24 to the periphery 18, meeting the margins 24 at the outer edges of the drill 10. At the outer edge of the fluted lands 16 the cutting lips 28 have a negative radial rake.

As shown in FIG. 1, the chisel edge 26 is an "s-shaped" edge. The chisel edge 26 extends from the leading cutting lip 28a adjacent the periphery 18 of the drill 10 across the central portion of the cutting point 11 to a trailing cutting lip 28b thereby defining two symmetrical drill point halves 34 and 36. Each drill point half 34 and 36 is comprised of a primary relief surface 30, a secondary relief surface 32 and third relief surface 38. The primary relief surface 30 is inclined radially outwardly from the central chisel edge 26 and downwardly from the cutting lip 28 to a relatively steeper inclined secondary relief surface 32.

Referring to FIGS. 1–5, the primary relief surface 30 meets the leading cutting lip 28a along a length of the lip extending from the outside edge at the margin 24 partway toward the chisel edge 26. The primary relief surface 30 extends back from the leading cutting lip 28a and over toward the secondary relief surface 32. The primary relief surface 30 is generally convexly curved, pie-shaped.

The secondary relief surface 32 meets the chisel edge 26 and the cutting lip along the length thereof extending from the chisel edge partway toward the outside edge to where the primary relief surface 30 ends and also meets the rake surface of the flute 14. The secondary relief surface 32 extends downward from the chisel edge 26, and rearward from the primary relief surface 30, and radially outwardly toward the periphery 18. The secondary relief surface 32 is inclined at an angle of approximately 20–60 degrees with respect to a line perpendicular to the central axis (C) of the twist drill 10. In a preferred embodiment, the secondary relief surface 32 is inclined at an angle of about 30 degrees. The secondary relief surface 32 is also generally convexly curved, pie-shaped.

Figure 3:
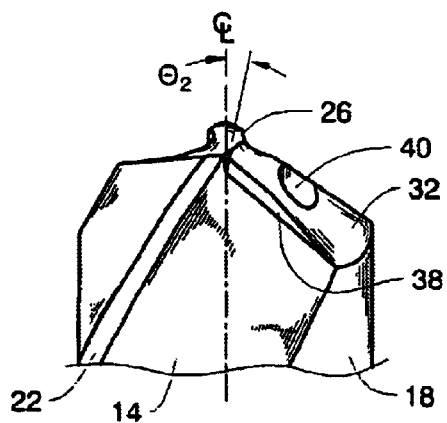
FIG. 3 is an enlarged partial perspective view of the twist drill of FIG. 2.
Figures 4, 5:
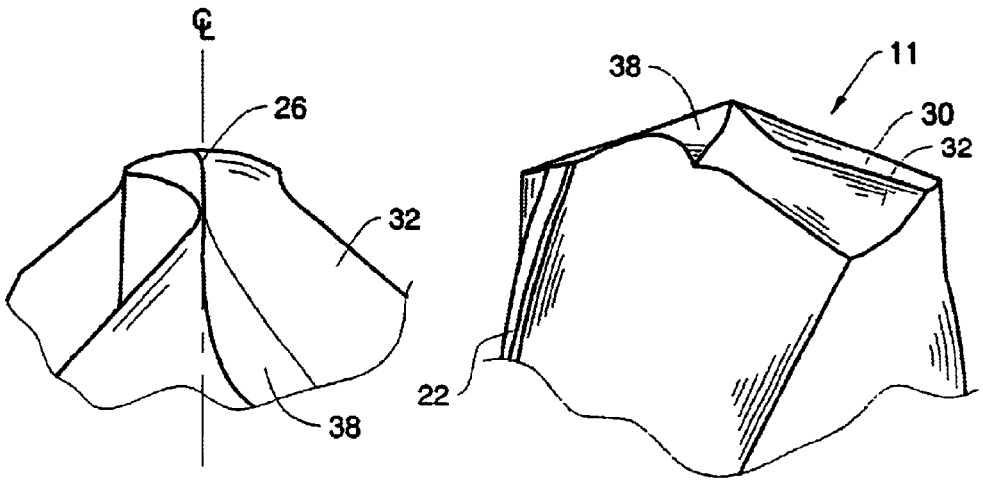
FIG. 4 is an enlarged partial view of the chisel edge of the twist drill of FIG. 1.
FIG. 5 is an enlarged partial view of the chisel edge of the twist drill of FIG. 1.
Figure 6:
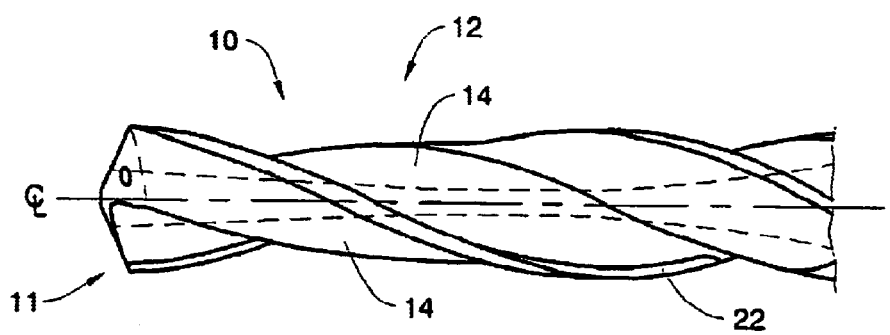
FIG. 6 is a side view of the twist drill of FIG. 1.
Figure 7:
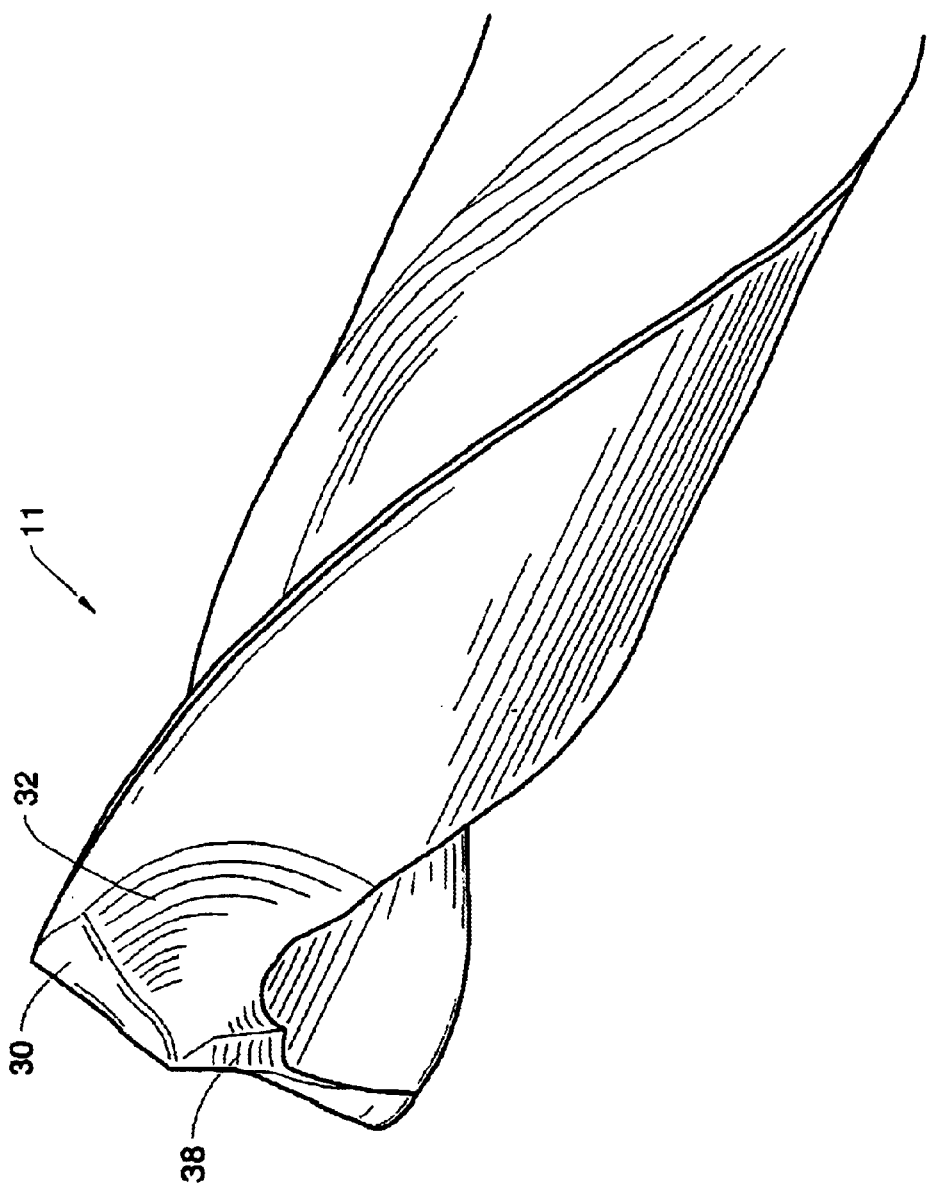
FIG. 7 is an enlarged partial view of the chisel edge of the twist drill illustrating an alternate embodiment of the third relief surface.
Figure 8:
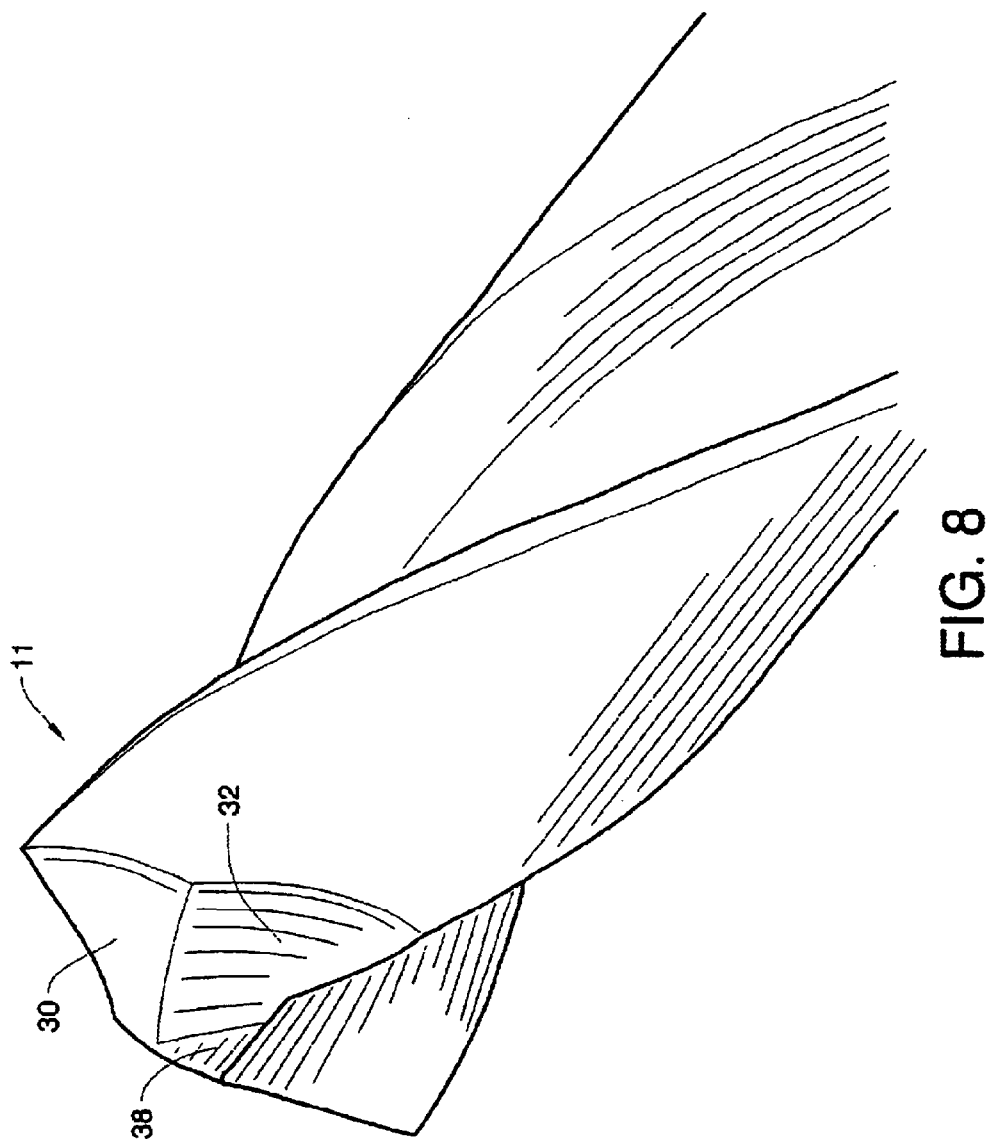
FIG. 8 is an enlarged partial view of the chisel edge of the twist drill illustrating another alternate embodiment of the third relief surface.

The third relief surface 38 aids in chip control and evacuation of removed material from the cutting point 11 as the twist drill drills into a workpiece surface. The third relief surface 38 meets the secondary relief surface 32 and the rake surface of the flute 14 and meets the s-shaped chisel edge 26. The third relief surface 38 extends from the s-shaped chisel edge 26 downwardly to the rake surface of the flute 14 and is inclined at an angle greater than the secondary relief surface 32. The angle of inclination of the third relief surface 38 is greater than the secondary relief surface 32 which is greater than the primary relief surface 30. As shown in FIG. 3, the third relief surface 38 is at an angle $\theta_2$ of about 0–2 degrees from the central axis (C). The third relief surface 38 is also generally pie-shaped. The third relief surface 38 may be concave or convex and, in a preferred embodiment, substantially planar.

The drill point may include a coolant channel hole 40 as known in the art and shown in the drill bit of FIGS. 1–3 and 6.

The twist drill in accordance with the present invention may be manufactured using a variety of metal removal (milling and grinding) and/or pressing and/or heat-treatment process steps as required as well known in the art. For a more detailed description of the manufacture of the s-shaped chisel edge reference is made to U.S. Pat. No. 4,826,368, incorporated herein by reference.

The following examples are offered by way of illustration and not by way of limitation.

EXAMPLE 1

A test was conducted to compare the required thrust for three different drill point geometries to drill a hole. The drills geometries tested were in accordance with the present invention incorporating a third relief surface and standard commercially available drills geometries not incorporating the third relief surface. The drill geometries were tested on 4140 steel ((200 SFM (60.0MPM) @ 0.012 IPR) (0.304 MMR)) and 1018 steel ((290 SFM (88.3MPM) @ 0.012 IPR) (0.304 MMR)) using a Makino A-55 horizontal power drill. The holder and toolholding device was a HSEM0709R1SSF075 and HSK63ATG100 collet chuck commercially available from Kennametal Inc. The tested inserts were KSEM1927MDM and KSEM1927HPM are standard inserts commercially available from Kennametal Inc.

As shown below in Tables 1 and 2, the insert modified in accordance with the present invention consistently ran lower thrust in both materials.

TABLE 1

Material 1018/290 SFM @ 0.012 IPR

| Insert | Average Measured Thrust Per 10 Holes |
| --- | --- |
| KSEM1927MDM | 1037.51 lbs. |
| KSEM1927HPM | 949.04 lbs. |
| KSEM19.27MDM Modified in accordance with the invention | 815.46 lbs. (22% lower than STD) |

TABLE 2

Material 4140/200 SFM @ 0.012 IPR

| Insert | Average Measured Thrust Per 10 Holes |
| --- | --- |
| KSEM1927MDM | 948.54 lbs. |
| KSEM1927HPM | 1065.80 lbs |
| KSEM1927MDM Modified in accordance with the invention | 833.38 lbs (13% lower than STD) |

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A drill comprising:

a cutting point and a body including at least two diametrically opposite flutes, the body including a periphery, a web and lands extending from the web and having margins at leading edges of the lands, wherein the flutes are positioned between the land, the cutting point including a leading cutting lip and a trailing cutting lip and a central "s-shaped" chisel edge extending between the leading and trailing cutting lips and defining two symmetrical drill point halves, wherein each drill point half includes a primary relief surface, a secondary relief surface and a third relief surface;

the primary relief surface is inclined radially outwardly from the central chisel edge to the periphery of the body and downwardly from the leading cutting lip to the secondary relief surface;

the secondary relief is inclined radially outwardly from the central chisel edge to the periphery of the body and downwardly from the primary relief surface to a rake surface of the flute;

the third relief surface is inclined radially outwardly from the central chisel edge to the rake surface of the flute and downwardly from the central chisel edge to the secondary relief surface;

wherein the third relief surface is inclined at an angle greater than the secondary relief surface and the secondary relief surface is inclined at an angle greater than the primary relief surface;

wherein the third relief surface is substantially planar.

2. The drill of claim 1 wherein the flutes have a 30 degree helix angle bounding diametrically opposite fluted lands.

3. The drill of claim 1 wherein the body is generally cylindrical in shape.

4. The drill of claim 1 wherein the cutting point is a single angle cutting point.

5. The drill of claim 4 wherein the cutting point has a point angle of approximately 140 degrees.

6. The drill of claim 1 wherein the outer edge of the fluted lands of the cutting lips have a negative radial rake.

7. A cutting point for a drill including a body having a periphery, the cutting point comprising a leading cutting lip and a trailing cutting lip and an "s-shaped" central chisel edge extending between the leading and trailing cutting lips and defining two symmetrical drill point halves, wherein each drill point half includes a primary relief surface, a secondary relief surface and a third relief surface;

the primary relief surface is inclined radially outwardly from the central "s-shaped" chisel edge to the periphery of the body and downwardly from the leading cutting lip to the secondary relief surface;

the secondary relief is inclined radially outwardly from the central "s-shaped" chisel edge to the periphery of the body and downwardly from the primary relief surface to a rake surface of the flute;

the third relief surface is inclined radially outwardly from the central "s-shaped" chisel edge to the rake surface of the flute and downwardly from the central chisel edge to the secondary relief surface;

wherein the third relief surface is inclined at an angle greater than the secondary relief surface and the secondary relief surface is inclined at an angle greater than the primary relief surface;

wherein the third relief surface is concave.

8. The drill of claim 1 wherein the primary relief surface is convexly curved.

9. The drill of claim 1 wherein the secondary relief surface is convexly curved.

10. The drill of claim 1 wherein the secondary relief surface is inclined at an angle of approximately 20–60 degrees with respect to a line perpendicular to a central axis of the drill.

11. The drill of claim 10 wherein the secondary relief surface is inclined at an angle of about 30 degrees.

12. The drill of claim 7 wherein the third relief surface is inclined at an angle of about 0–2 degrees from the central axis.

13. The drill of claim 1 wherein the third relief surface is inclined at an angle of about 0–2 degrees from the central axis.

14. The drill of claim 7 wherein the secondary relief surface is convexly curved.

15. A drill comprising:

a cutting point and a body including at least two diametrically opposite flutes, the body including a periphery, a web and lands extending from the web and having margins at leading edges of the lands, wherein the flutes are positioned between the land, the cutting point including a leading cutting lip and a trailing cutting lip and a central "s-shaped" chisel edge extending between the leading and trailing cutting lips and defining two symmetrical drill point halves, wherein each drill point half includes a primary relief surface, a secondary relief surface and a third relief surface;

the primary relief surface is inclined radially outwardly from the central chisel edge to the periphery of the body and downwardly from the leading cutting lip to the secondary relief surface;

the secondary relief is inclined radially outwardly from the central chisel edge to the periphery of the body and downwardly from the primary relief surface to a rake surface of the flute;

the third relief surface is inclined radially outwardly from the central chisel edge to the rake surface of the flute and downwardly from the central chisel edge to the secondary relief surface;

wherein the third relief surface is inclined at an angle greater than the secondary relief surface and the secondary relief surface is inclined at an angle greater than the primary relief surface;

wherein the third relief surface is concave.

16. The drill of claim 7 wherein the secondary relief surface is inclined at an angle of approximately 20–60 degrees with respect to a line perpendicular to a central axis of the drill.

17. A cutting point for a drill including a body having a periphery, the cutting point comprising a leading cutting lip and a trailing cutting lip and an "s-shaped" central chisel edge extending between the leading and trailing cutting lips and defining two symmetrical drill point halves, wherein each drill point half includes a primary relief surface, a secondary relief surface and a third relief surface;

the primary relief surface is inclined radially outwardly from the central "s-shaped" chisel edge to the periphery of the body and downwardly from the leading cutting lip to the secondary relief surface;

the secondary relief is inclined radially outwardly from the central "s-shaped" chisel edge to the periphery of the body and downwardly from the primary relief surface to a rake surface of the flute;

the third relief surface is inclined radially outwardly from the central "s-shaped" chisel edge to the rake surface of the flute and downwardly from the central chisel edge to the secondary relief surface;

wherein the third relief surface is inclined at an angle greater than the secondary relief surface and the secondary relief surface is inclined at an angle greater than the primary relief surface;

wherein the third relief surface is planar.

18. The cutting point of claim 17 wherein the flutes have a 30 degree helix angle bounding diametrically opposite fluted lands.

19. The cutting of claim 17 wherein the body is generally cylindrical in shape.

20. The cutting point of claim 17 wherein the cutting point is a single angle cutting point.

21. The cutting point of claim 20 wherein the cutting point has a point angle of approximately 140 degrees.

22. The cutting point of claim 17 wherein the outer edge of the fluted lands of the cutting lips have a negative radial rake.

23. The drill of claim 16 wherein the secondary relief surface is inclined at an angle of about 30 degrees.

24. The cutting point of claim 17 wherein the primary relief surface is convexly curved.

25. The cutting point of claim 17 wherein the secondary relief surface is convexly curved.

26. The cutting point of claim 17 wherein the secondary relief surface is inclined at an angle of approximately 20–60 degrees with respect to a line perpendicular to a central axis of the drill.

27. The cutting point of claim 26 wherein the secondary relief surface is inclined at an angle of about 30 degrees.

28. The drill of claim 7 wherein the primary relief surface is convexly curved.

29. The cutting point of claim 17 wherein the third relief surface is inclined at an angle of about 0–2 degrees from the central axis.

30. The drill of claim 7 wherein the outer edge of the fluted lands of the cutting lips have a negative radial rake.

31. The drill of claim 7 wherein the cutting point is a single angle cutting point.

32. The drill of claim 31, wherein the cutting point has a point angle of approximately 140 degrees.

33. The drill of claim 15 wherein the flutes have a 30 degree helix angle bounding diametrically opposite fluted lands.

34. The drill of claim 15 wherein the body is generally cylindrical in shape.

35. The drill of claim 15 wherein the cutting point is a single angle cutting point.

36. The drill of claim 35 wherein the cutting point has a point angle of approximately 140 degrees.

37. The drill of claim 15 wherein the outer edge of the fluted lands of the cutting lips have a negative radial rake.

38. The drill of claim 15 wherein the primary relief surface is convexly curved.

39. The drill of claim 15 wherein the secondary relief surface is convexly curved.

40. The drill of claim 15 wherein the secondary relief surface is inclined at an angle of approximately 20–60 degrees with respect to a line perpendicular to a central axis of the drill.

41. The drill of claim 40 wherein the secondary relief surface is inclined at an angle of about 30 degrees.

42. The drill of claim 15 wherein the third relief surface is inclined at an angle of about 0–2 degrees from the central axis.

43. The drill of claim 7 wherein the flutes have a 30 degree helix angle bounding diametrically opposite fluted lands.

44. The drill of claim 7 wherein the body is generally cylindrical in shape.

* * * * *